United States Patent
Ingram et al.

(10) Patent No.: US 7,691,190 B2
(45) Date of Patent: Apr. 6, 2010

(54) METHOD OF RETARDING QUICKLIME FOR GLASS MANUFACTURE

(75) Inventors: Kevin D. Ingram, Fort Worth, TX (US); Fred R. Huege, Colleyville, TX (US)

(73) Assignee: Chemical Lime Company, Fort Worth, TX (US)

( * ) Notice: Subject to any disclaimer, the term of this patent is extended or adjusted under 35 U.S.C. 154(b) by 1188 days.

(21) Appl. No.: 11/265,737

(22) Filed: Nov. 2, 2005

(65) Prior Publication Data

US 2007/0098610 A1 May 3, 2007

(51) Int. Cl.
*C09D 11/00* (2006.01)
*C03C 6/00* (2006.01)
*C03B 5/16* (2006.01)
*C03B 3/00* (2006.01)
*C03B 1/00* (2006.01)

(52) U.S. Cl. .............. 106/31.05; 65/482; 65/134.5; 65/135.9; 501/27

(58) Field of Classification Search .............. 106/31.05; 501/27; 65/482, 134.5, 135.9
See application file for complete search history.

(56) References Cited

U.S. PATENT DOCUMENTS

| | | | | |
|---|---|---|---|---|
| 2,127,952 A * | 8/1938 | Choate | ..................... | 106/775 |
| 2,155,721 A * | 4/1939 | Lee | ............................. | 501/27 |
| 3,214,145 A * | 10/1965 | Brown, Jr. | ................... | 366/94 |
| 3,489,578 A | 1/1970 | Pugh | ........................... | 106/52 |
| 3,760,051 A | 9/1973 | Eirich et al. | ................ | 264/117 |
| 3,775,069 A * | 11/1973 | Whitney | ..................... | 44/268 |
| 3,852,087 A * | 12/1974 | Nordyke et al. | ........ | 106/287.17 |
| 3,930,833 A * | 1/1976 | Roberts | ..................... | 71/64.1 |
| 3,956,446 A | 5/1976 | Eirich et al. | ................ | 264/117 |
| 4,028,131 A | 6/1977 | Pons | .......................... | 106/52 |
| 4,303,447 A * | 12/1981 | Buchanan et al. | .......... | 501/103 |
| 4,341,566 A * | 7/1982 | Barrett et al. | ............... | 106/313 |
| 4,443,240 A * | 4/1984 | Shutt et al. | .................... | 65/21.1 |
| 4,526,603 A | 7/1985 | Lehman et al. | ............... | 65/136 |
| 4,844,753 A * | 7/1989 | Katayama et al. | .......... | 148/251 |
| 5,378,279 A * | 1/1995 | Conroy | ...................... | 106/719 |
| 5,431,992 A * | 7/1995 | Houpt et al. | ................ | 442/353 |
| 5,536,310 A * | 7/1996 | Brook et al. | ................ | 106/708 |
| 5,686,374 A * | 11/1997 | Nakaoka | ..................... | 502/313 |
| 5,714,002 A * | 2/1998 | Styron | ........................ | 106/705 |
| 6,395,205 B1 | 5/2002 | Huege et al. | .................. | 264/42 |
| 7,383,699 B2 * | 6/2008 | Hockman | ................. | 65/135.9 |
| 2001/0054331 A1 * | 12/2001 | Yasuda et al. | ................. | 75/628 |
| 2004/0204304 A1 | 10/2004 | Hockman | ..................... | 501/27 |
| 2007/0245854 A1 * | 10/2007 | Lynch et al. | .................. | 75/406 |

* cited by examiner

*Primary Examiner*—Jerry Lorengo
*Assistant Examiner*—Shuangyi Abu Ali
(74) *Attorney, Agent, or Firm*—Charles D. Gunter, Jr.

(57) ABSTRACT

A method is shown for retarding the reactivity of quicklime. The quicklime is contacted with an aqueous solution of a boron-containing compound after being calcined. The boron-containing solution can be sprayed on the quicklime as it moves past on a conveyor belt. The retarded quicklime can be used for various industrial purposes and is especially useful as a reactant in a glass making operation.

5 Claims, 1 Drawing Sheet

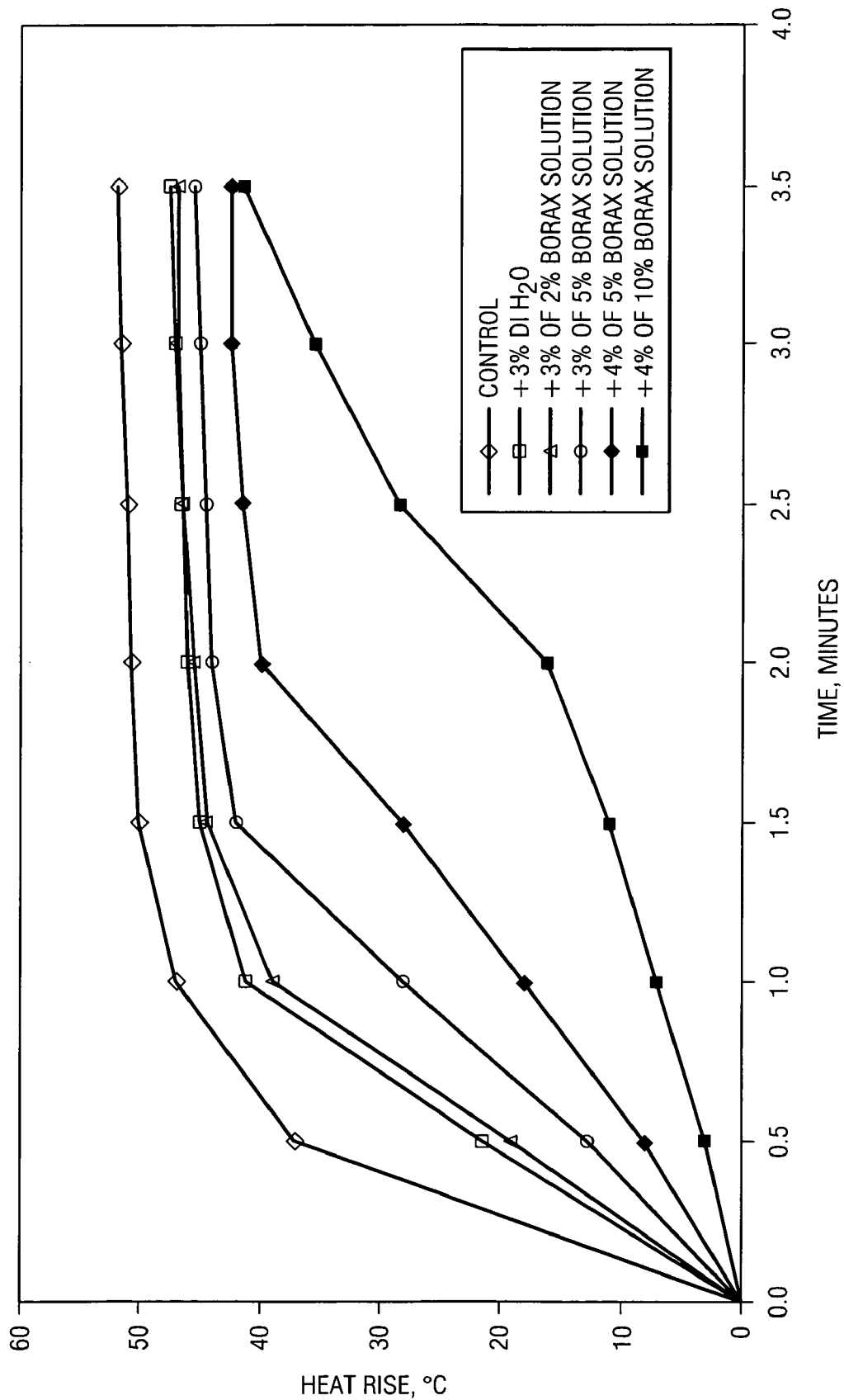

METHOD OF RETARDING QUICKLIME FOR GLASS MANUFACTURE

BACKGROUND OF THE INVENTION

A. Field of the Invention

The present invention relates to a process for the manufacture of glass in which a controlled reactivity quicklime component is utilized, and to improvements in producing controlled reactivity quicklimes.

B. Description of the Prior Art

Quicklime, CaO, is produced by the calcination of limestone, $CaCO_3$, during which processing calcium carbonate is broken down into solid calcium oxide and gaseous $CO_2$. The resulting calcium oxide readily reacts with water to form calcium hydroxide. This reaction is rapid and very exothermic. The reaction will generate on the order of 490 BTU's per pound of quicklime. Most end uses of quicklime involve the reaction of quicklime with water or water vapor at some point in the process. The resulting exothermic reaction which occurs can be undesirable. There are also several uses of quicklime in which rapid heat evolution is neither needed nor desirable due to process parameters or safety concerns. Thus, there is a need for technology that can address these concerns.

One area of interest is that of traditional glass manufacture. The lime or limestone component present in glass manufacture serves several important functions. For example, it renders the glass more insoluble so that glass can be used unrestrictedly in contact with water and chemical solutions. It also improves the mechanical properties of glass by making it less brittle and stronger. It also improves the general appearance of glass by providing a more enduring luster. Limestone and lime are the lowest-cost fluxing materials for glass. They flux the silica sand, forming chemically fused calcium silicates.

The combined tonnage of lime and limestone in glass manufacture is close to that of soda ash and is easily the third major component of glass. The proportions of lime or limestone, stated as CaO and MgO, are shown below with the percentages of silica sand, as $SiO_2$ and soda ash, as $Na_2O$:

| | |
|---|---|
| $SiO_2$ | 68-75% |
| $Na_2O$ | 10-18 |
| CaO | 5-14% |
| MgO | 0-10% |

In addition to these basic ingredients, other chemical or mineral additives are typically added to the glass batch to produce greater opacity, decolorization, heat resistance, and other diverse physical characteristics. Batches of these raw materials are then introduced into suitable high temperature reactor vessel, where the ingredients are fused at about 1650-2200° C. to a molten state. The extremely high temperature causes the components to react to form the chemically stable but complex sodium calcium magnesium silicate, of which glass is primarily composed.

In the United States, most glassmakers tend to use limestone, $CaCO_3$, for their source of calcium. Quicklime, CaO, offers the possibility of using less energy in the glassmaking process, since it does not have to be calcined in the glass furnace. However, highly reactive quicklime can react with free moisture/waters of hydration of other batch components causing the batches to stick together. It can also build up static charge, which interferes with the accurate movement and weighing of the quicklime portion of the batch. A properly retarded quicklime will have reduced reactivity with any water from the batch. It will also have better flow characteristics which will minimize static charge problems.

There are several existing technologies for reducing the reactivity of quicklime. However, they all suffer from one or more disadvantages. A simple way to reduce the reactivity of quicklime is to "hard burn" the limestone in the kiln. This produces a product that reacts with water at a slower pace. The down side of this technique is that it consumes more energy than regular lime production and may have to be separated out in special runs and thus be produced separately from the regular lime production. Implementing this process requires a significant amount of time to set up and is thus only effective when producing a large quantity of quicklime with a particular reactivity.

Chemical additives have also been used in the past to reduce the reactivity of quicklime. For example, Applicant's prior U.S. Pat. No. 6,395,205, issued May 28, 2002, to Huege et al., describes an improved controlled reactivity quicklime for use in manufacturing aerated autoclaved concrete materials. This patent teaches that the reactivity of quicklime may be modified through the use of a "chemical modifier" including glycerols, glycols, lignosulafonates, amines and polyacrylates, metal sulfates, gypsum, sulfuric acid, phosphoric acid, carboxylates, sucrose and mixtures thereof (column 2, lines 55-59).

The addition of water and $CO_2$ are also known to reduce the reactivity of quicklime by coating the outside of the individual particles with calcium hydroxide and/or calcium carbonate. This method, while it works, can be difficult to precisely control as far as the final product reactivity which is achieved. The addition of weak solutions of sulfuric acid, sugar and lignosulfonates also will retard the reactivity of lime, but also have production control problems and potential deleterious side effects in the end user's process. Organics such as amines, as discussed above, will also reduce reactivity, but the presence of the organic moiety may also interfere in some manner with the final use of the lime, such as by adding chemical oxygen demand (COD) to the quicklime in some cases.

A need exists, therefore, for an improved controlled reactivity quicklime which is useful in producing glass and other manufactured products and which can be utilized for other industrial purposes.

A need exists for such a controlled reactivity quicklime which does not depend upon the calcination process itself or varying the parameters of such process.

A need exists for a controlled reactivity quicklime which can be fine tuned to produce a variety of quicklime reactivities quickly and economically, even in small quantities.

A need exists for an improved process to produce a controlled reactivity quicklime having a particular reactivity for a particular end use.

A need exists for a chemical modifier to produce a controlled reactivity quicklime which can be used to pretreat the quicklime prior to use in a glass making or other process which provides the desired degree of control over reactivity.

A need exists for a chemically modified quicklime with a controlled reactivity which does not have adverse effects on the quality of the ultimate product which is produced, such as by increasing the chemical oxygen demand of the ultimate product.

SUMMARY OF THE INVENTION

The present invention involves the discovery that the reactivity of quicklime can be retarded by contacting the quicklime with a boron containing compound. Preferably, this is accomplished by the application of an aqueous solution of a boron-containing compound, such as a saturated borax solution. The result is a quicklime with a reactivity profile that mimics the profile of a harder burned quicklime. Preferably, the application of the saturated borax solution is accomplished prior to the quicklime being milled or ground in order to disperse the borax throughout the entire sample of the material.

The application of the borax solution to the quicklime is easy to control and progressive in nature. Thus, the higher the percentage of borax solution added, and the higher the percentage borax in the solution, the higher the retardation of the reactivity of the quicklime.

It is preferred to add the borax chemical modifier component as an aqueous solution and not as a solid powder. The water present in the aqueous solution acts as a carrier and allows better dispersion of the borax throughout the quicklime. The water also acts in cooperation with the borax to reduce the reactivity of the quicklime.

In the improved glass manufacturing technique of the invention, the controlled reactivity quicklime component, silica sand and soda ash, together with any other desired additives, are combined and are then introduced into suitable high temperature vessel, where the ingredients are fused at about 1650-2200° C. to a molten state. The extremely high temperature causes the components to react to form a complex sodium calcium magnesium silicate. The quicklime which is used to form the CaO component of the glass manufacturing batch is modified by pretreatment with a saturated borax solution to provide the desired degree of chemical reactivity in the glass forming mixture.

Additional objects, features and advantages will be apparent in the written description which follows.

BRIEF DESCRIPTION OF THE DRAWINGS

FIG. 1 is a graph of exotherm curves showing the reactivity of untreated quicklime versus quicklime treated with diionized water and various strength solutions of borax over a time period of 0 to about 3.5 minutes.

DETAILED DESCRIPTION OF THE INVENTION

In the discussion which follows, the term "quicklime" will be take n to mean calcium oxide, CaO, and should not be confused with limestone (calcium carbonate). As briefly outlined in Applicant's background discussion, quicklime is manufactured from limestone by heating to remove carbon dioxide. Quicklime can be converted to $Ca(OH)_2$ by a slaking process where water and CaO are mixed under agitation and temperature to produce $Ca(OH)_2$, known in the industry as slaked lime or lime hydrate. The present invention is directed toward a method to produce a quicklime having a controlled reactivity, for example, in the presence of water, water vapor, or reaction condensate.

In the traditional production of quicklime, raw limestone is first fed to a calciner which is typically a horizontal or vertical kiln. The kiln is fired by burners which typically utilize pulverized coal as a fuel and are capable of reaching calcining temperatures in excess of 2000° F. The intense heat causes a chemical reaction as follows:

$$CaCO_3 + heat = CaO \text{ (quicklime)} + CO_2$$

The quicklime which is produced by the above calcining reaction is very reactive in the presence of water or water vapor. Contact with water or moisture results in an exothermic reaction generating heat and calcium hydroxide:

$$CaO + H_2O = Ca(OH)_2 + heat + steam$$

As stated in the Background discussion, this reaction is highly exothermic and can generate on the order of 490 BTU's of heat per pound of quicklime.

The present invention involves the discovery that the reactivity of quicklime can be retarded by using a boron-containing compound, which supplies a source of boron ions, as a "chemical modifier" of the quicklime. While various sources of boron might be available, a relatively inexpensive and widely available source is borax. Borax is known chemically as hydrated sodium borate, $Na_2B_4O_7 \cdot 10H_2O$, an ore of boron, that is commonly used as a cleaning compound and which is readily commercially available from a number of sources.

The borax can be applied in any of a number of different ways. For example, the borax can be applied as a saturated aqueous solution, as a suspension of borax (i.e., a greater than 10% concentration) and even by co-grinding dry borax with the quicklime.

For purposes of the present invention, the borax is preferably applied to the quicklime as a saturated borax solution. Borax readily dissolves in water, with about 9 grams per 100 grams of water forming a saturated solution at room temperature. Preferably, the application of the saturated borax solution is accomplished prior to or during the quicklime being milled or ground in order to disperse the borax throughout the entire quicklime sample. As has been mentioned briefly, the application of the borax solution to the quicklime is easy to control and progressive in nature. Thus, the higher the percentage of borax solution added, and the higher the percentage borax in the solution, the higher the retardation of the reactivity of the quicklime. The quicklime is preferably pretreated with, for example, 2-5% by weight based on the total weight of quicklime, of a 2-10% by volume solution of borax in water. The treatment can be accomplished in any convenient manner. The borax solution can be sprayed or dribbled onto a conveyor belt as the quicklime is passing to a ball mill or a roller mill at about, for example 15-20 tons per hour. A spray bar or other means can be used to provide an even distribution of the borax solution as the quicklime moves along the conveyor belt. The borax solution can also be introduced directly into the mill.

It is also desirable to add the borax chemical modifier component as an aqueous solution and not as a solid powder. The water present in the aqueous solution acts as a carrier and allows better dispersion of the borax throughout the quicklime. The water also acts synergistically in cooperation with the borax to reduce the reactivity of the quicklime. Thus, while solid borax alone can be utilized as a retarding agent, it is preferred to add the borax chemical modifier component as an aqueous solution and not as a solid powder.

In order to evaluate the reactivity of the chemically modified quicklime, industry standard tests such as those published by the American Society of Testing Materials or modifications thereof can be utilized. According to a modified ASTM C-110 test procedure, the rise in heat of a given quantity of quicklime in a given quantity of water with respect to time under standard conditions is measured. In an aqueous solution of borax, water tends to retard the initial 30-second heat rise, allowing the borax to retard the longer term reactivity. A typical quicklime may have a 30second rise of 35-40° C. (per ASTM C110). Addition of dry borax alone to the quicklime or slaking water may result in the reduction in heat rise to 20-25° C. The addition of 3% water may offer the same reduction in reactivity. The use of a 3% saturated aqueous solution of borax as a "pretreatment" has been seen to lower the 30 second heat rise to as low as 4-5° C.

Referring now to FIG. 1 of the drawings, the exotherm curve designated as "Control" represents the reactivity of conventional quicklime calcined in a rotary kiln with no chemical additive. The exotherm curve designated as "3% DI $H_2O$" represents the reactivity of conventional quicklime treated with 3% pure water. The remaining exotherm curves shown the effects on reactivity where the quicklime is treated with various strength solutions of borax, as taught by the present invention. Each of the exotherm curves representing the reactivity of conventional quicklime which has been treated with the chemical additive of the invention reflects a decreased reactivity from the conventional quicklime with no additive. The greatest effect is represented by the exotherm curve for "4% of a 10% borax solution".

The amount of borax which is utilized obviously depends upon the degree or retardation which is desired for the particular end application at hand. Generally speaking, the chemical modifier is used in the range from about 0.1 to 5% by weight, preferably about 0.1 to 3% by weight, where a 2-10% saturated borax solution is utilized.

Another desirable quality of borax treated quicklime is an improvement in material handling characteristics. Quicklime acts as an insulator and can build up a static charge. Pulverized quicklime has relatively high surface area and small particles. Thus, the buildup of static charge is more noticeable in smaller sized material and can have major detrimental effects on the flow characteristics of the material. When applied in an aqueous solution to improve the application, borax acts as a flow aid by altering the surface chemistry of the quicklime particles. Static charge buildup is minimized and the material handling and flow characteristics are greatly improved.

Borax also acts as a grinding aid for quicklime. Whenever static charge is minimized, interparticle reactions are improved within a grinding mill. Thus, energy transfer is improved and better grinding efficiencies are obtained. This allows the grinder to either produce a smaller sized ground material with the same effort, or to produce the same sized material with a higher throughput within a mill. This can be desirable for either the end user or the producer of the material.

One specific use of borax-retarded quicklime is in the glass industry. In the United States, most glassmakers tend to use limestone for their source of calcium. Quicklime offers the possibility of using less energy in the glassmaking process since it does not have to be calcined in the glass furnaces. Highly reactive quicklime can react with free moisture/waters of hydration of other batch components causing the batch components to stick together. It can also build up static charge, which interferes with the accurate movement and weighing of the quicklime portion of the batch. A borax-retarded quicklime will have reduced reactivity with any water from the batch. It will also have better flow characteristics which will minimize static charge problems. It is also batch friendly since many glassmakers use boric acid or borax in their glass raw ingredients. The borax does not add any carbon which would burn in the furnace and have a negative chemical oxygen demand (COD) penalty for the glass batch.

In the improved glass manufacturing technique of the invention, the controlled reactivity quicklime component, silica sand and soda ash, together with any other desired additives, are combined and are then introduced into suitable high temperature vessel, where the ingredients are fused at about 1650-2200° C. to a molten state. The high temperature present within the reaction vessel causes the components to react to form a complex sodium calcium magnesium silicate. The quicklime which is used to form the lime component of the glass manufacturing batch is modified by pretreatment with a saturated borax solution to provide the desired degree of chemical reactivity in the glass forming mixture, as has been previously described.

The benefits of using borax as a retarder as listed are directed towards pulverized high calcium quicklime at an end users location. There will also be benefits in other uses of quicklime. This would include the use of borax treatments for dolomitic quicklime for certain end uses. It could also be used to modify the reactivity of high calcium or dolomitic quicklime before its introduction into hydrator units in order to modify the properties of the end product hydrate, including particle size, surface area and flowability. It would also appear that any boron containing compound might be able to produce similar reduction of reactivity, and improvements in flowability and grinding of the quicklime.

While the invention has been shown in several of its forms, it is not thus limited but is susceptible to various changes and modifications without departing from the spirit thereof.

We claim:

1. A method of retarding the reactivity of quicklime, comprising the steps of:

calcining a supply of limestone in a calcination step to form a source of quicklime;

after the calcination step, contacting the quicklime with a boron-containing compound to thereby form a chemically modified quicklime, the contact between the boron-containing compound and the quicklime being effective to retard the initial 30 second heat rise of the chemically modified quicklime to about 20-25° C. or below during subsequent slaking as measured according to ASTM C110; and wherein the quicklime is contacted with 0.1 to 5% by weight, based upon the total weight of quicklime, of a 2-10% by volume solution of borax in water.

2. The method of claim 1, wherein the quicklime is contacted with the solution of borax in water after it has been calcined but prior to grinding and further processing.

3. The method of claim 1, wherein the boron-containing compound is provided as an aqueous solution which is added directly to a grinding mill as the quicklime is being ground.

4. The method of claim 1, wherein the boron-containing compound is provided as an aqueous solution of borax which is sprayed onto the quicklime as it moves from a calciner to a grinding mill.

5. A method of retarding the reactivity of quicklime, comprising the steps of:

forming a saturated solution of borax in water;

using the saturated solution as a pretreatment which is applied to the quicklime after it has been calcined but prior to grinding and further processing, wherein the quicklime is treated with 0.1 to 5% by weight, based upon the total weight of quicklime, of a 2-10% by volume solution of borax in water; and wherein the saturated solution of borax is applied to the quicklime by spraying the solution onto the quicklime as it moves on a conveyor from a calciner to a grinding mill.

\* \* \* \* \*